(12) United States Patent
Abe et al.

(10) Patent No.: US 12,180,995 B2
(45) Date of Patent: Dec. 31, 2024

(54) CRANKSHAFT AND METHOD OF MANUFACTURING THE SAME

(71) Applicant: NIPPON STEEL CORPORATION, Tokyo (JP)

(72) Inventors: Tatsuhiko Abe, Tokyo (JP); Yoko Sueyasu, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/264,496

(22) PCT Filed: Mar. 4, 2022

(86) PCT No.: PCT/JP2022/009266
§ 371 (c)(1),
(2) Date: Aug. 7, 2023

(87) PCT Pub. No.: WO2022/209568
PCT Pub. Date: Oct. 6, 2022

(65) Prior Publication Data
US 2024/0044358 A1 Feb. 8, 2024

(30) Foreign Application Priority Data
Mar. 29, 2021 (JP) .................................. 2021-056268

(51) Int. Cl.
*F16C 3/08* (2006.01)
*C21D 6/00* (2006.01)
(Continued)

(52) U.S. Cl.
CPC ................ *F16C 3/08* (2013.01); *C21D 6/002* (2013.01); *C21D 6/005* (2013.01); *C21D 6/008* (2013.01); *C21D 8/005* (2013.01); *C21D 9/30* (2013.01); *C22C 38/001* (2013.01); *C22C 38/002* (2013.01); *C22C 38/02* (2013.01); *C22C 38/04* (2013.01); *C22C 38/06* (2013.01);
(Continued)

(58) Field of Classification Search
CPC .... F16C 3/08; F16C 2202/02; F16C 2202/04; C21D 9/30
See application file for complete search history.

(56) References Cited

U.S. PATENT DOCUMENTS 8,389,108 B2 * 3/2013 Moriguchi ............ C23C 28/048
428/908.8
8,802,005 B2 * 8/2014 Mizuno ................... C22C 38/06
420/128
(Continued)

FOREIGN PATENT DOCUMENTS

DE 69738069 T2 * 5/2008 ............... C21D 1/10
JP 2000337345 A 12/2000
(Continued)

*Primary Examiner* — Jacob J Cigna
(74) *Attorney, Agent, or Firm* — Greer Burns & Crain Ltd.

(57) ABSTRACT

A crankshaft with improved fatigue strength is provided. A crankshaft 10 includes journals 11, pins 12, and fillets 14, each fillet 14 having a residual stress distribution where the residual stresses are compressive residual stresses from the surface down to a depth of at least 300 μm, the maximum value of the compressive residual stress being not lower than 1000 MPa, the surface roughness Rz being lower than 3.00 μm.

5 Claims, 2 Drawing Sheets

(51) Int. Cl.
*C21D 8/00* (2006.01)
*C21D 9/30* (2006.01)
*C22C 38/00* (2006.01)
*C22C 38/02* (2006.01)
*C22C 38/04* (2006.01)
*C22C 38/06* (2006.01)
*C22C 38/24* (2006.01)

(52) U.S. Cl.
CPC .......... *C22C 38/24* (2013.01); *F16C 2202/02* (2013.01); *F16C 2202/04* (2013.01); *F16C 2204/62* (2013.01); *F16C 2204/64* (2013.01); *F16C 2204/74* (2013.01); *F16C 2220/70* (2013.01); *F16C 2240/18* (2013.01); *F16C 2360/22* (2013.01)

(56) References Cited

U.S. PATENT DOCUMENTS

| | | | |
|---|---|---|---|
| 2014/0182414 A1 | 7/2014 | Kim et al. | |
| 2019/0010589 A1* | 1/2019 | Takaoka | B21J 5/008 |
| 2021/0404512 A1* | 12/2021 | Kammerstaetter | F16C 3/08 |

FOREIGN PATENT DOCUMENTS

| | | | |
|---|---|---|---|
| JP | 2004116721 A * | 4/2004 | |
| JP | 4000648 B2 | 10/2007 | |
| JP | 4198268 B2 * | 12/2008 | |
| JP | 2010007145 A * | 1/2010 | |
| JP | 2018112222 A * | 7/2018 | |
| WO | 2013015085 A1 | 1/2013 | |

* cited by examiner

CRANKSHAFT AND METHOD OF MANUFACTURING THE SAME

TECHNICAL FIELD

The present invention relates to a crankshaft and a method of manufacturing the same.

BACKGROUND ART

Global tightening of exhaust-gas regulations require constant improvements in the fatigue strength of crankshafts. In induction-hardened crankshafts, hardness is improved by increasing C content to improve fatigue strength. However, increasing C content increases the likelihood that quench cracking occurs.

WO 2013/15085 discloses a steel to be induction hardened that provides good quench-cracking resistance, and a crankshaft manufactured from such a steel.

Japanese Patent No. 4000648 describes a method of manufacturing a high-strength gear that involves performing induction hardening or carburizing-quenching, followed by shot peening in two or more stages, and then grinding only the tooth surfaces.

JP 2000-337345 A discloses a method of manufacturing a crankshaft in which the round portions of the fillets of a crankshaft, each joining a crank pin or a journal to a crank web, are high-frequency heated and then rapidly cooled for quenching, followed by low-temperature tempering of the entire crankshaft, and then the fillets' round portions are rolled.

PRIOR ART DOCUMENTS

Patent Documents

Patent Document 1: WO 2013/15085 A1
Patent Document 2: Japanese Patent No. 4000648
Patent Document 3: JP 2000-337345 A

SUMMARY OF THE INVENTION

Problems to be Solved by the Invention

Quench cracking may occur during induction hardening; in view of this, C content cannot be significantly increased in a crankshafts, which has a complex geometry and thus can easily develop quench cracking. The maximum hardness obtained by induction hardening depends on C content, and thus there is a limit to the maximum hardness that can be obtained by induction hardening.

An object of the present invention is to provide a crankshaft with improved fatigue strength and a method of manufacturing such a crankshaft.

Means for Solving the Problems

A crankshaft according to one embodiment of the present invention is a crankshaft including a journal, a pin, and a fillet, the fillet having a residual stress distribution where a residual stress is a compressive residual stress from a surface down to a depth of at least 300 μm, a maximum value of the compressive residual stress being not lower than 1000 MPa, a surface roughness Rz being lower than 3.00 μm.

A method of manufacturing a crankshaft according to another embodiment of the present invention is a method of manufacturing the above-described crankshaft, including: preparing an intermediate product of the crankshaft; quenching the intermediate product; grinding the quenched intermediate product; and rolling the fillet of the ground intermediate product with a Hertzian stress not less than 550 kgf/mm$^2$.

Effects of the Invention

The present invention provides a crankshaft with improved fatigue strength.

EMBODIMENTS FOR CARRYING OUT THE INVENTION

Figure 1:
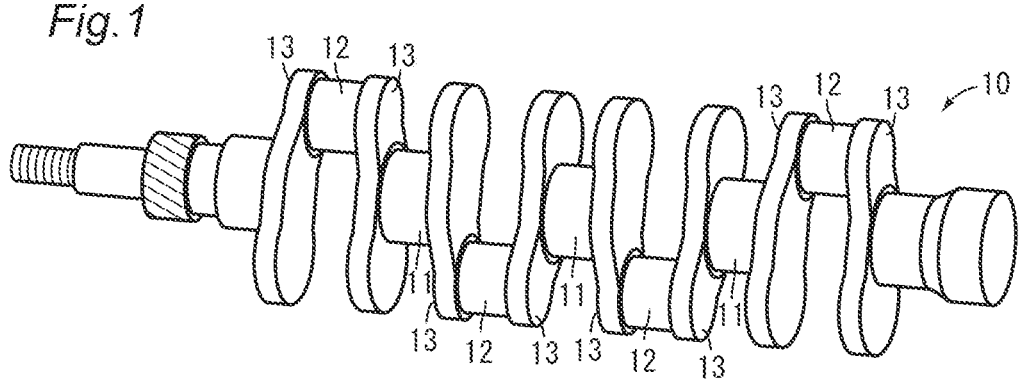
FIG. 1 is a schematic view of a crankshaft according to one embodiment of the present invention.

The present inventors investigated how to improve the fatigue strength of a crankshaft, and obtained the following findings.

To improve the fatigue strength of a crankshaft, it is effective to provide compressive residual stresses to the surface layers of the fillets, which receive the highest stresses. On the other hand, to prevent internal fractures, it is necessary to provide compressive residual stresses not only to the outermost layer of a fillet, but to a region of the fillet extending down to a certain depth from the surface. Specifically, improved fatigue strength will be achieved if the residual stresses are compressive residual stresses from the surface down to a depth of at least 300 μm and the maximum value of the compressive residual stress is not lower than 1000 MPa.

An effective process for providing high compressive residual stresses to the fillets involves, after quenching of the crankshaft, performing rolling with a predetermined surface pressure or higher (i.e., fillet rolling). This is presumably because applying a high surface pressure to the quenched microstructure (i.e., martensite) causes plastic deformation of the martensite.

As taught in Japanese Patent No. 4000648, the surface hardness of gears or the like is improved by performing shot peening after induction hardening. However, while the thickness of the hardened layer introduced by induction hardening is on the order of several millimeters, the thickness of the hardened layer introduced by shot peening is on the order of dozens of micrometers, an improvement in fatigue strength that is not worth an additional step. On the other hand, rolling can provide compressive residual stresses to a range on the order of hundreds of micrometers.

A structure after quenching has a high notch susceptibility; as such, to improve fatigue strength, it is necessary to reduce surface roughness. Although depending on the degree of surface roughness prior to processing, performing rolling increases surface roughness. Accordingly, to reduce surface roughness after rolling, it is necessary to sufficiently reduce surface roughness prior to rolling.

The present invention was made based on these findings. Now, embodiments of the present invention will be described in detail with reference to the drawings. The same or corresponding components in the drawings are labeled with the same reference numerals, and their description will not be repeated. The size ratios of the components shown in the drawings do not necessarily represent their actual size ratios.

[Crankshaft]

FIG. 1 is a schematic view of a crankshaft 10 according to one embodiment of the present invention. The crankshaft 10 includes journals 11, pins 12, and arms 13.

The crankshaft 10 may be made of a steel material for mechanical structures, for example. Although not limiting, the crankshaft 10 may be made of a carbon steel material for mechanical structures in accordance with JIS G 4051:2016, or an alloyed steel material for mechanical structures in accordance with JIS G 4053:2016, for example. Among such steel materials, S45C and S50C in accordance with JIS G 4051:2016 and SMn438 in accordance with JIS G 4053:2016 are preferable, and a steel material obtained by adding S to such a steel material to improve its machinability is particularly preferable.

The crankshaft 10 may have a chemical composition of, for example, in mass %: 0.10 to 0.55% C; 0.05 to 1.00% Si; 0.80 to 1.50% Mn; up to 0.030% P; 0.005 to 0.100% S; 0.05 to 0.30% Cr; 0.005 to 0.050% Al; 0.0050 to % N; 0 to 0.20% Ni; 0 to 0.45% Mo; 0 to 0.20% V; and the balance Fe and impurities.

A lower limit for C content is, in mass %, preferably 0.30%, more preferably 0.35%, yet more preferably 0.37%, and still more preferably 0.40%.

The journals 11 are supported on a cylinder block (not shown). The pins 12 are coupled to connecting rods (not shown). The arms 13 connect the journals 11 and pins 12. The journals 11 and pins 12 slide over the bearings provided on the cylinder block and connecting rods, respectively.

Figure 2:
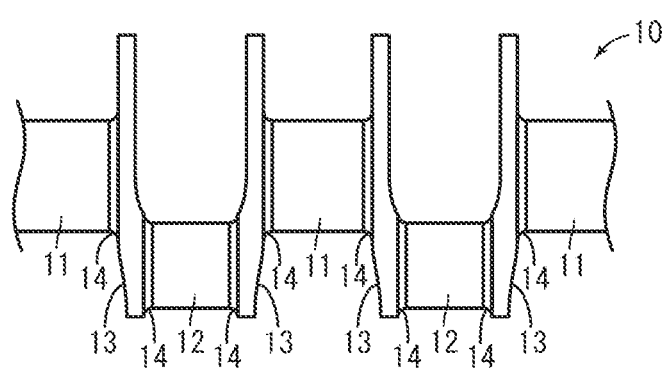
FIG. 2 is an enlarged view of some of the journals and pins.

FIG. 2 is an enlarged view of some of the journals 11 and pins 12 of the crankshaft 10. The crankshaft 10 further includes fillets 14, each provided at the border between a journal 11 and an adjacent arm 13 or at the border between a pin 12 and an adjacent arm 13. As used herein, both the fillets adjacent to the journals 11 and the fillets adjacent to the pins 12 will be referred to as fillets 14 without a distinction.

The fillets 14 are the portions of the crankshaft 10 that receive the highest stresses. The fatigue properties of the crankshaft 10 are significantly affected by the fatigue strength of the fillets 14.

The fillets 14 of the crankshaft 10 according to the present embodiments have a residual stress distribution in which the residual stresses from the surface down to a depth of at least 300 μm are compressive residual stresses, and the maximum value of the compressive residual stress is not lower than 1000 MPa.

Providing compressive residual stresses to the surface layer of each fillet 14 prevents development of fissures that would represent initiation points for cracks, thereby increasing fatigue strength. Typically, fissures are developed in the surface, which receives the highest stresses. However, depending on the residual stress distribution and/or hardness distribution in a fillet 14, a fracture from an initiation point in the interior (i.e., internal fracture) may be developed. To prevent internal fractures, it is necessary to provide compressive residual stresses not only to the outermost layer of a fillet, but also to a region extending down to a certain depth from the surface of the fillet 14. Specifically, improved fatigue strength will be achieved if a fillet 14 has a residual stress distribution in which the residual stresses are compressive residual stresses from the surface down to a depth of at least 300 μm and the maximum value of the compressive residual stress is not lower than 1000 MPa.

The residual stress distribution of a fillet 14 may be calculated using X-ray diffraction (XRD) measurement and by the cos α method. Specifically, the surface of a fillet 14 is dissolved by electropolishing down to a depth at which measurement is to be made, and the obtained surface is irradiated with X-rays to calculate the residual stress at this particular depth. The residual stress in the outermost layer can be calculated by directly irradiating the surface of the fillet 14 with X-rays.

The residual stress distribution of a fillet 14 is preferably such that the residual stresses are compressive residual stresses from the surface down to a depth of at least 400 μm. More preferably, the residual stress distribution of a fillet 14 is such that the residual stresses are compressive residual stresses from the surface down to a depth of at least 500 μm, yet more preferably such that the residual stresses are compressive residual stresses from the surface down to a depth of at least 600 μm, and still more preferably such that the residual stresses are compressive residual stresses from the surface down to a depth of at least 650 μm.

The maximum value of the compressive residual stress in a fillet 14 is preferably not lower than 1200 MPa, more preferably not lower than 1300 MPa, yet more preferably not lower than 1500 MPa, still more preferably not lower than 1700 MPa, and yet more preferably not lower than 1900 MPa. Although not limiting, an upper limit for the maximum value of the compressive residual stress in a fillet 14 is 2300 MPa, for example.

The larger the depth of a range to which compressive residual stresses are applied, the better internal fractures can be prevented, leading to improved fatigue strength. The position at which compressive residual stress is highest is preferably a depth in the fillet 14 not smaller than 250 μm from the surface. The position at which compressive residual stress is highest is more preferably a depth not smaller than 300 μm from the surface, yet more preferably a depth not smaller than 350 μm from the surface, and still more preferably a depth not smaller than 400 μm from the surface.

Further, in the crankshaft 10 according to the present embodiments, the surface roughness of a fillet 14, Rz, is lower than 3.00 μm. Even if a fillet 14 has such a residual stress distribution as specified above, a sufficient fatigue strength may not be obtained if the surface roughness of the fillet 14 is not appropriate.

According to the present embodiments, surface roughness is evaluated using maximum height roughness Rz, not arithmetical mean roughness Ra. A fatigue fracture is assumed to initiate from the weakest point. In the present context, the weakest point is estimated to be the location of the deepest valley in the roughness profile. Whereas an arithmetical mean roughness Ra indicates a mean roughness within an evaluation length, Rz indicates the maximum height (Rp) plus the maximum depth (Rv) within an evaluation length. When fatigue fracture is to be evaluated, Rz is assumed to have better correspondence than Ra.

Surface roughness Rz (i.e., maximum height roughness Rz) is defined by JIS B 0601:2013. The reference length for measurement of surface roughness Rz is to be 1.25 mm, the cutoff value λs 2.5 μm, and the cutoff value λc 0.25 mm. The direction of measurement is to be the axial direction of the crankshaft 10.

The surface roughness Rz of a fillet 14 is preferably not higher than 2.80 μm, more preferably not higher than 2.50

μm, yet more preferably not higher than 2.00 μm, still more preferably not higher than 1.50 μm, and yet more preferably not higher than 1.20 μm.

In the crankshaft 10 according to the present embodiments, the hardness of a fillet 14 at a depth of 250 μm from the surface is preferably not lower than HV 650. A lower limit for the hardness of a fillet 14 at a depth of 250 μm from the surface is preferably HV 680, and more preferably HV 750. Although not limiting, an upper limit for the hardness of a fillet 14 at a depth of 250 μm from the surface is HV 900, for example.

The hardness of a fillet 14 may be measured by taking a sample from the crankshaft 10, where a cut surface parallel to the axis of the crankshaft (i.e., longitudinal cross section) is to serve as the measurement surface, and making a measurement at the measurement surface in accordance with JIS Z 2244:2020. The testing force is to be 100 gf (0.981 N).

The microstructure of the outermost layer of a fillet 14 is preferably a microstructure containing martensite. More specifically, the microstructure of the outermost layer of a fillet 14 is preferably a microstructure containing martensite in not less than 80 volume %. The volume ratio of the martensite in the outermost layer of a fillet 14 is more preferably not lower than 90 volume %, and yet more preferably not lower than 95 volume %. A fillet 14 may have a microstructure where only the outermost layer contains martensite, or a microstructure where a region extending all the way to the core contains martensite. The thickness of the region containing martensite is preferably not smaller than 1.0 mm, more preferably not smaller than 2.0 mm, and yet more preferably not smaller than 3.0 mm.

[Method of Manufacturing Crankshaft]

Figure 3:
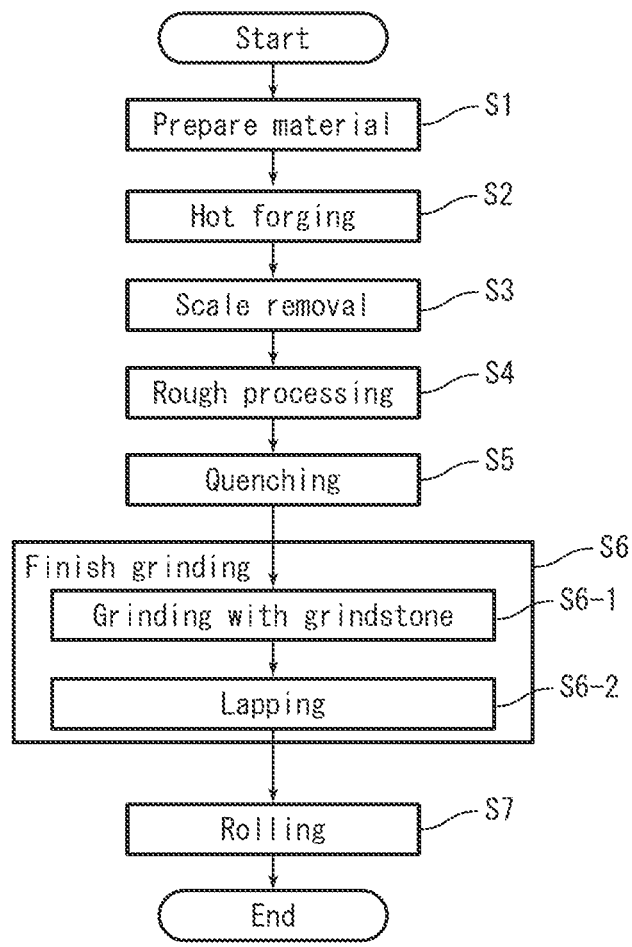
FIG. 3 is a flow chart showing an exemplary method of manufacturing a crankshaft according to one embodiment of the present invention.

An exemplary method of manufacturing the crankshaft 10 will now be described. FIG. 3 is a flow chart illustrating an exemplary method of manufacturing the crankshaft. The manufacturing method includes the step of preparing a material (step S1), a hot-forging step (step S2), a scale removal step (step S3), a rough-processing step (step S4), a quenching step (step S5), a finish-grinding step (step S6), and a rolling step (step S7).

A material for a crankshaft is prepared (step S1). The material may be produced by, for example, continuously casting or blooming a steel melt having a predetermined chemical composition.

The material is hot forged into a rough crankshaft shape (step S2). The hot forging process may be divided into rough forging and finish forging.

After hot forging, shot peening or the like is performed to remove scale that has formed during hot forging (step S3).

The roughly shaped crankshaft product is subjected to rough processing (i.e., machining) (step S4). The rough processing involves cutting, grinding and hole drilling, for example. This step results in an intermediate product having a shape similar to that of the intended final product.

The roughly processed intermediate crankshaft product is quenched (step S5). Specifically, the product is heated to a predetermined heating temperature and then rapidly cooled. This may be done by local heating with high-frequency induction heating equipment, or by heating the entire intermediate product in a heat-treat furnace. Induction hardening is more preferable. The heating temperature is preferably not lower than the $Ac_3$ point. Specifically, the heating temperature is preferably not lower than 850° C., more preferably not lower than 900° C., and yet more preferably not lower than 950° C.

The quenched intermediate product is subjected to finish grinding (step S6). The finish grinding is such that the surface roughness Rz of the fillets 14 before rolling is lower than 1.00 μm. The surface roughness Rz of the fillets 14 must be lower than in cases where rolling is not performed, since the subsequent rolling (step S7) may increase the surface roughness Rz. If the surface roughness Rz of the fillets 14 after finish grinding is not lower than 1.00 μm, it is difficult to keep the surface roughness Rz of the fillets 14 after the rolling step (step S7) below 3.00 μm.

The finish grinding step (step S6) includes grinding with a grindstone (substep S6-1) and lapping (substep S6-2). The grinding with a grindstone may use, for example, a white alundum grindstone, an SG grindstone or an CBN grindstone. The lapping is performed a plurality of times, as necessary. Specifically, the first round of lapping uses a film with alumina abrasive applied thereto; if a sufficiently low Rz value is not achieved, a second and subsequent rounds of lapping are performed using a film with diamond abrasive applied thereto.

The intermediate product after finish grinding is subjected to rolling (i.e., fillet rolling), where a roller is brought into contact with the fillets 14 and the crankshaft 10 is rotated while the contact is kept (step S7). Here, the contact surface pressure between the fillets 14 and the roller (i.e., Hertzian stress) is to be not lower than 550 kgf/mm². If the contact surface pressure between the fillets 14 and roller is lower than 550 kgf/mm², it is difficult to raise the maximum value of compressive residual stress to 1000 MPa or higher. A lower limit for the contact surface pressure between the fillets 14 and roller is preferably 600 kgf/mm². Although not limiting, an upper limit for the contact surface pressure between the fillets 14 and roller is 900 kgf/mm², for example.

Thus, performing the composite surface treatment including the quenching step (step S5) and rolling step (step S7) relates in fillets 14 having a residual stress distribution where the residual stresses are compressive residual stresses from the surface down to a depth of at least 300 μm, and the maximum value of the compressive residual stress is not lower than 1000 MPa.

An exemplary construction of a crankshaft and an exemplary method of manufacturing a crankshaft according to embodiments of the present invention have been described, the present embodiments provide a crankshaft with improved fatigue strength.

EXAMPLES

Now, the present invention will be described more specifically by means of examples. The present invention is not limited to these examples.

Steels having the chemical compositions shown in Table 1 were used as materials to fabricate test shafts labeled Nos. 1 to 11.

TABLE 1

| | Chemical composition (in mass %, balance Fe and impurities) | | | | | | | | | Rz after finish grinding | Roll Hertzian stress | Composite surface treatment |
|---|---|---|---|---|---|---|---|---|---|---|---|---|
| No. | C | Si | Mn | P | S | Cr | V | Al | N | (μm) | (kgf/mm$^2$) | method |
| 1 | 0.39 | 0.70 | 1.40 | 0.015 | 0.044 | 0.17 | 0.09 | 0.020 | 0.0110 | 0.60 | 670 | IH + finish + roll |
| 2 | 0.50 | 0.74 | 1.30 | 0.005 | 0.042 | 0.10 | — | 0.030 | 0.0075 | 0.68 | 670 | IH + finish + roll |
| 3 | 0.45 | 0.50 | 1.20 | 0.015 | 0.050 | 0.10 | 0.12 | 0.030 | 0.0100 | 0.63 | 560 | IH + finish + roll |
| 4 | 0.39 | 0.67 | 1.44 | 0.014 | 0.063 | 0.12 | — | 0.003 | 0.0193 | 0.59 | 520 | IH + finish + roll |
| 5 | 0.39 | 0.69 | 1.42 | 0.018 | 0.044 | 0.17 | 0.09 | 0.024 | 0.0110 | 0.60 | — | IH + finish |
| 6 | 0.39 | 0.57 | 1.44 | 0.014 | 0.063 | 0.12 | — | 0.003 | 0.0193 | 0.61 | — | IH + finish + SP |
| 7 | 0.39 | 0.57 | 1.44 | 0.014 | 0.063 | 0.12 | — | 0.003 | 0.0193 | 0.64 | — | IH + finish + SP |
| 8 | 0.39 | 0.69 | 1.42 | 0.018 | 0.044 | 0.17 | 0.09 | 0.024 | 0.0110 | 0.65 | — | IH + finish + HP |
| 9 | 0.39 | 0.70 | 1.40 | 0.015 | 0.044 | 0.17 | 0.09 | 0.020 | 0.0110 | 4.00 | 660 | IH + roll |
| 10 | 0.45 | 0.50 | 1.20 | 0.002 | 0.050 | 0.10 | 0.12 | 0.030 | 0.0100 | 4.17 | 560 | IH + roll |
| 11 | 0.39 | 0.70 | 1.43 | 0.016 | 0.044 | 0.17 | 0.09 | 0.020 | 0.0110 | 0.60 | 200 | IH + finish + roll |

Specifically, a billet with a diameter of 120 mm was heated to 1100° C., and then hot forged into a circular column with a diameter of 70 mm. Thereafter, the column was machined in such a manner that a portion with a diameter of one-fourth of that of the column was left and then further ground to produce a shaft with a diameter of 15 mm and a length of 120 mm. This shaft was subjected to thermal treatment to achieve a uniform microstructure. Specifically, the shaft was heated to 900° C., and then oil quenched and cooled to 500° C. before being removed from the oil and air cooled. Thereafter, further machining was performed to fabricate a test shaft. Then, induction hardening was performed with high-frequency induction heating equipment, where the shaft was heated to a temperature not lower than the Ac$_3$ point and then water cooled.

Figure 4:
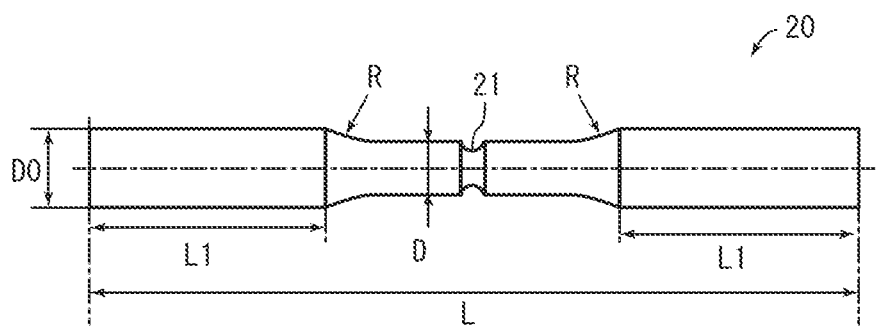
FIG. 4 is a plan view of a test shaft.

FIG. 4 is a plan view of a test shaft 20. In the test shaft 20, the outer diameter DO was 12 mm, the length L was 116 mm, the length of each grip section, L1, was 37 mm, the diameter of the parallel portion, D, was 8 mm, and the radius of curvature of the portions connecting the parallel portion with the respective grip sections, R, was 24 mm. The test shaft 20 had an annular groove 21 that simulated a fillet. The groove 21 had a depth of 0.5 mm and a radius of curvature of 1.5 mm.

After induction hardening, the test shafts other than Nos. 9 and 10 were subjected to finish grinding. The finish grinding included grinding with a grindstone and lapping. The grinding with a grindstone used a white alundum grindstone of a granularity of #100 to #220. The first round of lapping used a film with alumina abrasive applied thereto and, if a sufficiently reduced surface roughness Rz was not achieved, a second and subsequent rounds of lapping were performed using a film with diamond abrasive applied thereto.

To measure the surface roughness Rz of the groove 21 after the finish-grinding step, measurement was performed on another test specimen fabricated under the same conditions, using a contact roughness tester (SJ-412 from Mitutoyo Corporation). For the shafts labeled Nos. 9 and 10, which had not been subjected to the finish-grinding step, the surface roughness Rz of the groove 21 after induction hardening was measured. The measurements of surface roughness Rz are shown in Table 1.

For each of the test shafts labeled Nos. 1 to 4 and 9 to 11, after finish grinding (or after induction hardening for Nos. 9 and 10), rolling that simulated fillet rolling was performed on the groove 21 of the test shaft. Specifically, the test shaft was rotated while the groove 21 was in contact with a roller with the relevant contact surface pressure in the column "Roll Hertzian Stress" in Table 1.

For the test shaft labeled No. 5, rolling was not performed and only finish grinding was performed.

For test shafts labeled Nos. 6 and 7, shot peening was performed in lieu of rolling. In the shot peening, iron balls (of HV 800 or higher) with a diameter of 0.3 mm were propelled perpendicularly to hit the bottom of the groove 21 while the test shaft was being rotated. The exposure time was 15 seconds, the arc height was 0.227 mmA, and the coverage was 500%.

For the test shaft labeled No. 8, hammer peening was performed in lieu of rolling. The hammer peening employed was a method called ultrasonic impact treatment (UIT). The UIT method involves positioning metal pins between a tool that is vibrating ultrasonically and an object to be tested and hitting the object with ultrasonic impact to cause plastic deformation of the object. For the present test, UIT was performed on the groove 21 of the test shaft. The UIT conditions were as follows: the pin material was SUJ2 (of 62 HRC or higher), the pin diameter was 0.5 mm, the radius of curvature of the pin tips was 0.5 mm, and the ultrasonic vibration frequency was 27 kHz.

The column "Composite surface treatment method" in Table 1 lists outlines of the surface treatments performed on the various test shafts. In this column, "IH" means induction hardening, "finish" finish grinding, "roll" rolling, "SP" shot peening, and "HP" hammer peening.

For each of the fabricated test shafts, the surface roughness Rz of the groove 21, the residual stress distribution, and the hardness at a depth of 250 μm from the surface were measured. To measure the residual stress distribution, the bottom of the groove 21 was measured using CrKα rays, with a collimator diameter of 0.3 mm.

Fatigue testing was conducted on each test shaft. Specifically, an Ono's rotary bending fatigue tester was used to conduct the rotary bending fatigue testing as described in JIS Z 2274. The rotational speed of the test shaft was 3600 rpm. For each test shaft, an S-N diagram was obtained from this fatigue testing, and the highest bending-stress value at which the test shaft was not broken for a repetition number of $1.0 \times 10^7$ was treated as the fatigue strength of this particular test shaft.

The results are shown in Table 2.

TABLE 2

| No. | Rz (μm) | Max compressive residual stress (MPa) | Depth with max compressive residual stress (μm) | Max depth where residual stress are compressive residual stresses (μm) | Hardness at depth of 260 μm from surface (HV) | Fatigue strength (MPa) | Improvement ratio from base (%) | Other |
|---|---|---|---|---|---|---|---|---|
| 1 | 0.981 | 1964 | 400 | 652 | 769 | 1568 | 32 | Inv. ex. |
| 2 | 1.089 | 1760 | 500 | 740 | 809 | 1620 | 37 | Inv. ex |
| 3 | 1.035 | 1230 | 500 | 644 | 783 | 1600 | 35 | Inv. ex |
| 4 | 0.968 | 902 | 400 | 550 | 689 | 1325 | 12 | Comp. ex. |
| 5 | 0.601 | 442 | 30 | 372 | 648 | 1186 | Base | Comp. ex. |
| 6 | 6.802 | 1212 | 30 | 120 | 645 | 1313 | 11 | Comp. ex. |
| 7 | 7.091 | 1387 | 30 | 141 | 694 | 1313 | 11 | Comp. ex. |
| 8 | 1.866 | 1328 | 0 | 680 | 683 | 1224 | 3 | Comp. ex. |
| 9 | 3.003 | 1100 | 350 | 540 | 671 | 1201 | 1 | Comp. ex. |
| 10 | 3.343 | 1123 | 450 | 561 | 732 | 1270 | 7 | Comp. ex. |
| 11 | 0.882 | 760 | 250 | 440 | 704 | 1270 | 7 | Comp. ex. |

For each of the test shafts, the surface roughness Rz of the groove 21 is indicated in the column "Rz" in Table 2, the maximum value of compressive residual stress in the groove 21 is indicated in the column "Max compressive residual stress", the position (i.e., the depth from the surface) in the groove 21 at which compressive residual stress was highest is indicated in the column "Depth with max compressive residual stress", the maximum depth at which the residual stresses in the groove 21 were compressive residual stresses is indicated in the column "Max depth where residual stresses are compressive stresses", and the hardness at a depth of 250 μm from the surface of the groove 21 is indicated in the column "Hardness at depth of 250 μm from surface".

For each of the test shafts, the fatigue strength is indicated in the column "Fatigue strength" in Table 2; further, the ratio of improvement in fatigue strength relative to the test shaft labeled No. 5 is indicated in the column "Improvement ratio from base".

As shown in Table 2, for each of the test shafts labeled Nos. 1 to 3, the surface roughness Rz of the groove 21 was lower than 3.00 μm, the maximum value of compressive residual stress in the groove 21 was not lower than 1000 MPa, and the residual stress distribution had compressive residual stresses from the surface down to a depth of at least 300 μm. These test shafts had 30% or higher improvements in fatigue strength compared with the test shaft labeled No. 5.

The test shafts labeled Nos. 6 to 8 were subjected to shot peening or hammer peening in lieu of rolling. For each of these test shafts, the maximum value of compressive residual stress was not lower than 1000 MPa, but compressive residual stresses were provided to a shallow range. As such, they had insufficient improvements in fatigue strength compared with the test shafts labeled No. 1 to 3.

For each of the test shafts labeled Nos. 9 and 10, the maximum value of compressive residual stress of the groove 21 was not lower than 1000 MPa, and the residual stress distribution had compressive residual stresses from the surface down to a depth of at least 300 μm; however, the surface roughness Rz of the groove 21 was not lower than 3.00 μm. As such, they had insufficient improvements in fatigue strength compared with the test shafts labeled Nos. 1 to 3.

For each of the test shafts labeled Nos. 4 and 11, the maximum value of compressive residual stress in the groove 21 was lower than 1000 MPa. As such, they had insufficient improvements in fatigue strength compared with the test shafts labeled Nos. 1 to 3. The maximum value of compressive residual stress was lower than 1000 MPa presumably because the contact surface pressure during rolling was too low.

Although embodiments of the present invention have been described, the above-described embodiments are merely illustrative examples useful for carrying out the present invention. Thus, the present invention is not limited to the above-described embodiments, and the above-described embodiments, when carried out, may be modified as appropriate without departing from the spirit of the invention.

REFERENCE SIGNS LIST

10: crankshaft
11: journals
12: pins
13: arms
14: fillets

The invention claimed is:

1. A crankshaft comprising a journal, a pin, and a fillet, the fillet having a residual stress distribution where a residual stress is a compressive residual stress from a surface down to a depth of at least 300 μm, a maximum value of the compressive residual stress being not lower than 1000 MPa, a surface roughness Rz being lower than 3.00 μm.

2. The crankshaft according to claim 1, wherein the compressive residual stress is highest at a depth in the fillet not smaller than 250 μm from the surface.

3. The crankshaft according to claim 1, wherein a hardness of the fillet at a depth of 250 μm from the surface is not lower than HV 650.

4. A method of manufacturing the crankshaft according to claim 1, comprising:
  preparing an intermediate product of the crankshaft;
  quenching the intermediate product;
  grinding the quenched intermediate product; and
  rolling the fillet of the ground intermediate product with a Hertzian stress not less than 550 kgf/mm$^2$.

5. The method of manufacturing a crankshaft according to claim 4, wherein the surface roughness Rz of the fillet after the grinding and before the rolling is lower than 1.00 μm.

\* \* \* \* \*